Inventors:
Elmer E. Hallberg
Charles F. Vinci

Fig. 5.

Patented June 5, 1945

2,377,627

UNITED STATES PATENT OFFICE 2,377,627

ACTUATING SYSTEM FOR MACHINE TOOLS

Elmer E. Hallberg and Charles F. Vinci, Rockford, Ill., assignors to Rockford Machine Tool Company, Rockford, Ill., a corporation of Illinois Application December 27, 1943, Serial No. 515,638

15 Claims. (Cl. 90—49)

The invention relates generally to machine tools and more particularly to an actuating system for the movable supports thereof.

A general object of the invention is to provide in a machine tool having one or more movable supports new and improved means for actuating the supports eliminating many of the spline shafts, feed screws and gearing heretofore employed.

Among the more particular objects of the invention is the provision in a machine tool requiring one or more movable supports of a support containing a self-contained electrical power unit and means driven thereby and cooperating with means on the machine tool for driving the support enabling the machine to be conveniently and quickly built up with additional supports as required, the electrical unit being of a character permitting control thereof from a remote point for rapid traverse or feed rate of operation with the feed rate of operation the equivalent, for precision, of a mechanical connection between a control element and a support.

Another of the more particular objects of the invention is the provision in a machine tool having one or more movable supports of a self-synchronous motor and generator system with a motor of the system on each support operable to drive the support or a part thereof, and a common generator adapted to be connected in circuit with one or more of the motors to supply the controlling energy thereto.

Another object is to provide in a machine tool, having one or more movable supports, a wound-rotor, induction-type motor on each support and operable to drive the support or a part thereof, a wound-rotor, induction type generator, and a control circuit for the motor and generator operable to cause the generator to supply the controlling energy to the motor for effecting feed movement of the support and alternatively operable to cause the motor to operate as an induction motor independently of the generator for effecting rapid traverse movements of the support.

Another object is to provide in a machine tool, having a main reciprocatory member movable through a cutting and a return stroke and a plurality of movable supports to be operated in timed relation therewith, a wound-rotor, induction-type motor on each support and operable to drive the support or a part thereof, a generator having like characteristics as the motors, and a control circuit for connecting the generator and the motors in a self-synchronous system operable to cause the generator to supply controlling energy to one or more of the motors selectively and including means permitting additional motors to be brought into operation only when the generator is not rotating.

Still another object is to provide in a machine tool, having a main reciprocatory member movable through a cutting and a return stroke and a plurality of movable supports to be actuated step-by-step in timed relation with said member, hydraulic means for reciprocating the main member and electrical means for actuating the supports, each support containing a self-contained driving unit controllable from a remote station by means including a hydraulic device responsive to the pressures of the hydraulic means reciprocating the main member for determining the time of operation of the driving unit and a second pressure responsive device controlling the interval when additional units may be placed in operation.

Other objects and advantages will become apparent from the following detailed description taken in connection with the accompanying drawings, in which.

While the invention is susceptible of various modifications and alternative constructions, and is adaptable for use in a great variety of machine tools, it is herein shown and will hereinafter be described as embodied in a preferred form and in one type of machine tool. It is not intended, however, that the invention is to be limited thereby to the specific construction disclosed or to the specific embodiment. On the contrary, it is intended to cover all modifications and alternative constructions falling within the spirit and scope of the invention as defined in the appended claims.

Figure 1:
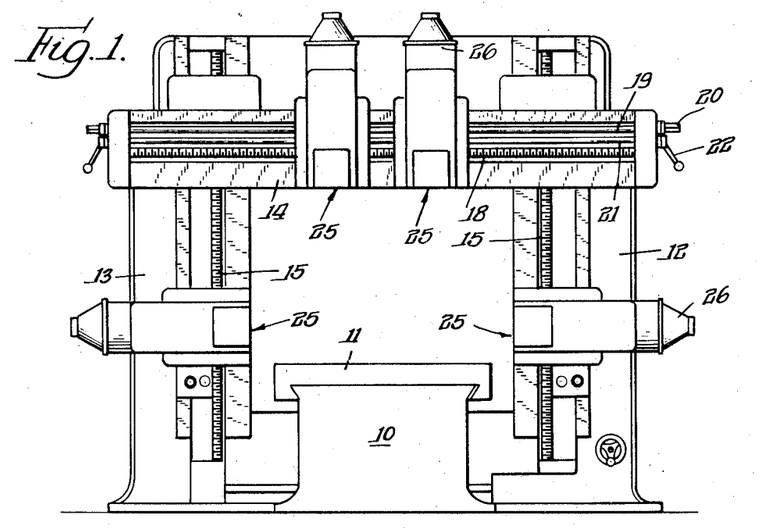
Fig. 1 is a front elevational view of a planer embodying the features of this invention.
Figure 2:
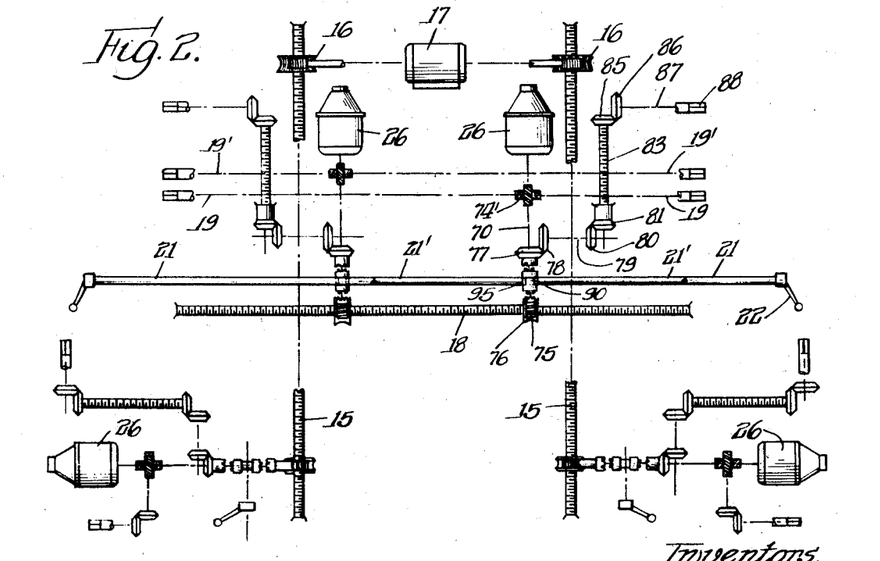
Fig. 2 is a skeleton and diagrammatic view illustrating certain drive trains forming a part of this invention.
Figure 3:
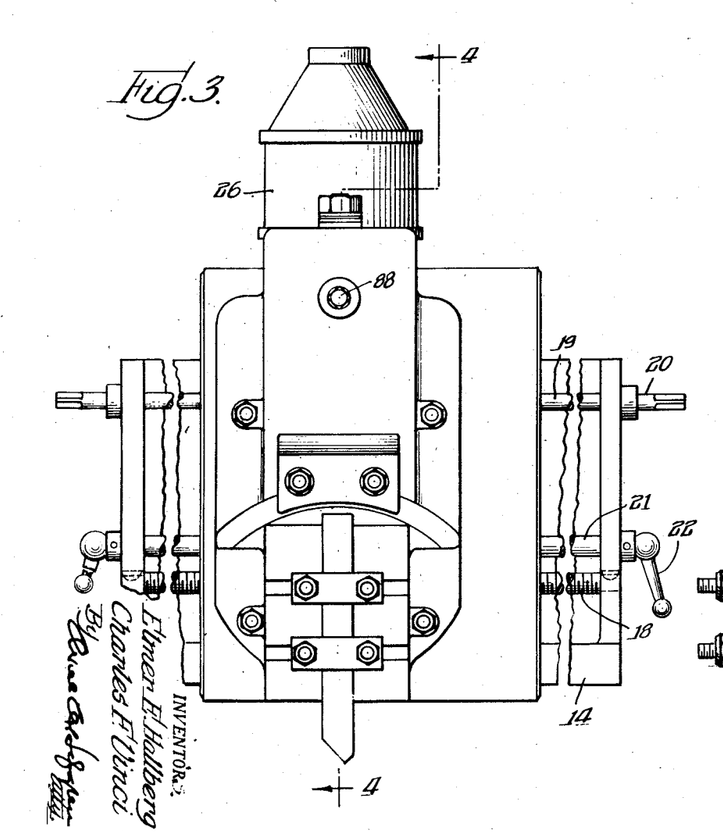
Fig. 3 is a fragmentary front elevational view showing the planer rail and one unit head mounted thereon.

Though the invention, as above stated, is capable of use in a great variety of machine tools, it is herein, by way of exemplary disclosure, shown as embodied in a planer and will hereinafter be described in that embodiment. The planer comprises generally (see Fig. 1) a bed 10, a main member or table 11 reciprocably mounted on the bed, upstanding columns 12 and 13 on either side of the bed, and a cross rail 14 adjustable vertically of the columns. Extending longitudinally of each column and non-rotatably mounted therein is a screw 15. Threadedly engaging each screw (see Fig. 2) is a nut 16 carried by the cross rail 14 and adapted to be driven in opposite directions by an electric motor 17, also carried on the cross rail, for the purpose of raising or lowering the cross rail. Extending longitudinally of the rail is a screw 18 also non-rotatably mounted. Extending parallel with the screw 18 are two shafts 19 and 19' each of which is, however, rotatably journaled near its ends in the ends of the cross rail 14 and projects at its ends from the cross rail to terminate in squared ends 20 suitable for manual actuation. Intermediate the screw 18 and the shafts 19 and 19' and extending parallel therewith are two rods 21 and 21' each rockably journaled near its ends in the ends of the cross rail and carrying externally of the cross rail actuating handles 22.

It is contemplated that one or more movable supports will form a part of any machine tool in which the invention is embodied. Herein four such movable supports, generally designated 25, are shown, one mounted on each column and two mounted on the cross rail. These movable supports, as will presently be described in greater particularity, are unitary, self-contained heads including an electric motor 26 and suitable means for engaging either the screw 15 or the screw 18 depending upon whether the head is mounted on the column or on the rail for effecting movement of the head relative to the column or the rail. The table 11 is adapted to be reciprocated at appropriate rates by hydraulic means of more or less conventional construction. The heads on the other hand are, as already indicated, actuated by electric motors 26 incorporated in a novel electrical control circuit enabling one or more of the motors to be operated simultaneously and each motor to move the head precise amounts at a feed rate or increased amounts at a traverse rate, with the feed movements of the heads governed by hydraulic means associated with and responsive to the hydraulic means reciprocating the table 11.

Figure 5:
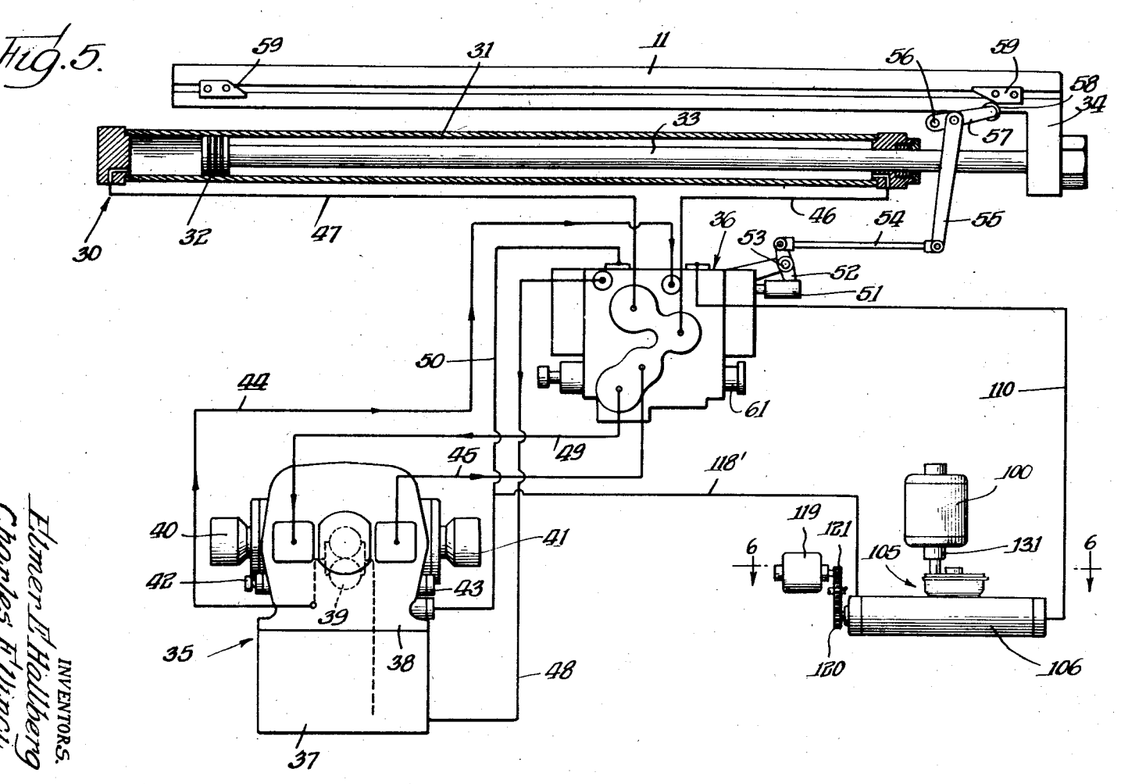
Fig. 5 is a diagrammatic view showing the hydraulic means for driving the planer table.
Figure 6:
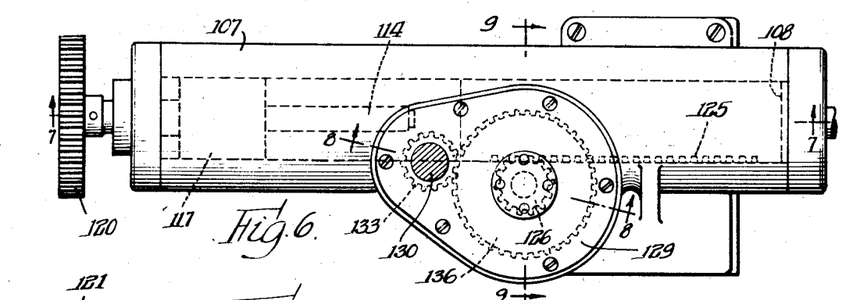
Fig. 6 is a view of the feed cylinder of Fig. 5 taken approximately along the line 6—6.

As previously stated, the table 11 is adapted to be reciprocated at proper rates by a conventional and well known hydraulic system. Inasmuch as the hydraulic drive of the table forms no part of this invention, it is believed that a very brief description of the system disclosed in Fig. 5 will suffice. The table is reciprocated by a hydraulic motor, generally designated 30, comprising a cylinder 31 fixed in the bed 10 and a piston 32 secured to one end of a piston rod 33 projecting outwardly through one end of the cylinder 31. The projecting end of the piston rod 33 is secured in well known and suitable manner to a depending portion 34 of the table 11. Conventionally, fluid is supplied to the motor 30 by a hydraulic circuit in a manner to cause a slow or feed rate of movement during the cutting or working stroke, and a higher or traverse rate of movement during the return stroke. The hydraulic circuit includes the motor 30, a pumping mechanism, generally designated 35, and a valve mechanism, generally designated 36. The pumping mechanism 35 and the valve mechanism 36 may be of any one of a number of commercial products, as, for example, a type D-R pump manufactured by The Oilgear Company, of Milwaukee, Wisconsin. This pump consists generally of a tank or reservoir 37 on which the pump casing 38 is mounted, the pump casing having, among other mechanisms, a gear type pump 39 and a variable displacement piston type pump. Suffice it to say that 40 indicates a means for adjusting the speed of the table during its cutting stroke, 41 indicates a means for adjusting the speed of the table during its return stroke, 42 indicates an automatic constant pressure relief valve in the return line of the tank 37, and 43 indicates a high pressure relief valve in the return line to the tank 37. The output of the gear pump 39 is conducted to the valve mechanism 36 through a conduit 44, whereas the high pressure fluid from the variable displacement piston pump is conducted to the valve mechanism by a conduit 45. The right hand end of the cylinder 31, as viewed in Fig. 5, is connected to the valve mechanism 36 by a conduit 46, while the left hand end of the cylinder 31 is connected to the valve mechanism by a conduit 47. A conduit 48 forms a return from the valve mechanism to the tank 37 and a conduit 49 forms a return from the valve mechanism to the pumping mechanism. A conduit 50 connects at one end to the valve mechanism and at the other end to the pumping mechanism, and functions to supply fluid to internal parts of the pumping mechanism when it is desired to obtain the maximum stroke of the variable stroke pump therein, which is during the return stroke.

The operation of the valve mechanism is controlled by means of a pilot valve having an operating member 51. This operating member is connected to one end of a lever 52 pivoted at 53, the other end of the lever being connected by means of a rod 54 to one arm 55 of a bell crank device pivotally supported at 56. The other arm 57 of the bell crank carries a roller 58 positioned to be actuated by one of a pair of dogs 59 secured to the table and effective at the ends of the cutting and return strokes, respectively, to cause reversal of the table by actuation of the pilot valve. Reversal of the table is effected, of course, by a reversal of the end of the cylinder 31 to which high pressure fluid is supplied. The pumping mechanism 35 is driven by an electric motor, not shown in Fig. 5 but represented diagrammatically at 60 in Fig. 10, and the valve mechanism includes a start and stop valve 61.

Figure 4:
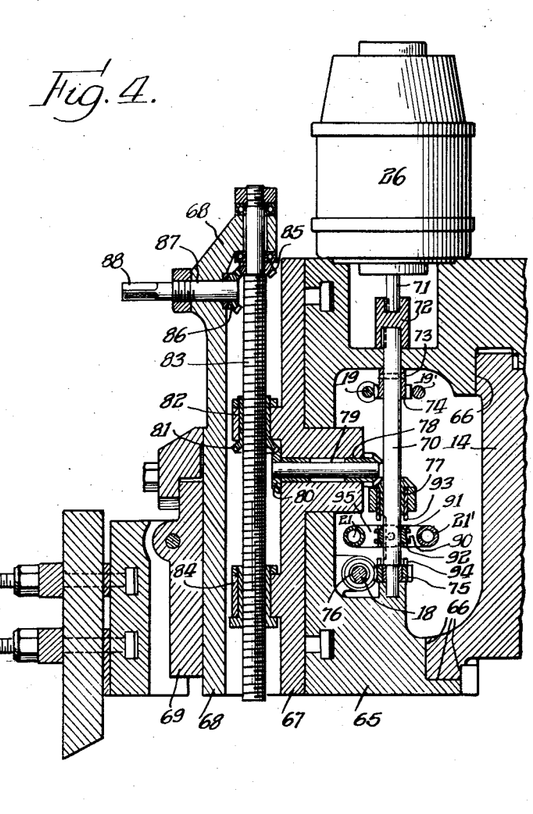
Fig. 4 is a sectional view taken approximately along the line 4—4 of Fig. 3.

Each unit head 25 comprises a saddle 65 adapted (Fig. 4) to be mounted on ways 66 formed on the cross rail 14 or the columns 12 and 13 to adapt the head for movement longitudinally of the rail or the columns. Rotatably mounted on the saddle is a swivel 67 and in turn mounted on the swivel is a slide 68, and carried by the slide 68 is a tool slide 69. In order that each head 25 may be a self-contained unit, it includes the motor 26 mounted at one end of the saddle 65 and mechanism driven by the motor and cooperating with means on the columns or cross slide for imparting movement to the head relative to the columns or cross slide, and alternatively for imparting movement to the slide 68 relative to the swivel 67. The mechanism comprises a shaft 70 rotatably journaled at its ends in the saddle 65 with one end connected to the motor shaft 71 by a coupling 72. Adjacent one end, the shaft has non-rotatably secured thereto, as by a pin 73, a gear 74 meshing with a gear 74' which is held for movement with the head and is adapted, when the head is mounted in position on the cross rail 14, to have a splined engagement with, for example, shaft 19 for manual rotation of the shaft 70. At the opposite end, there is rotatably mounted on the shaft 70 a worm 75, likewise adapted when the head is in position on the cross rail to engage a worm wheel 76 threadedly engaging the screw 18, and by means on the saddle 65 held against axial movement relative to the saddle. Intermediate the gear 74 and the worm 75, there is rotatably journaled in the saddle and in surrounding relation to the shaft 70 a bevel gear 77. This bevel gear meshes with a bevel gear 78 non-rotatably mounted on one end of a stub shaft 79 extending coaxially with the axis of the swivel 67. At the other end there is non-rotatably mounted on the stub shaft 79 a bevel gear 80 meshing with a bevel gear 81 rotatably supported against axial movement in a portion 82 of the swivel 67. The bevel gear 81 has threaded engagement with a screw 83 journaled and slidable in a portion 84 of the swivel and at the other end journaled for rotation but held against axial movement relative to the slide 68. Keyed to the shaft 83 near the end journaled in the slide 68 is a bevel gear 85 meshing with a bevel gear 86 fast on the end of an actuating shaft 87 projecting outwardly of the slide 68 and terminating in a squared end 88 for reception of an appropriate tool for manually rotating the shaft 83 and hence effecting movement of the slide 68 relative to the swivel 67.

Means is provided for alternate movement either of the head as a whole or of the slide 68 relative to the saddle by the motor 26. To that end, there is splined to the shaft 70 a clutch collar 90 having each face formed with clutch teeth 91 and 92. Cooperating teeth 93 and 94 are formed respectively on the bevel gear 77 and the worm 75. The clutch collar is shifted into engagement with one or the other of the bevel gear 77 or worm 75 by means of a yoke 95 splined on the shaft 21 so as to be rockable thereby and slidable therealong. It is believed readily apparent from the foregoing that, depending upon the engagement effected by the clutch collar 90, the motor 26 may be employed either to move the head as a whole or to move the slide 68 relative to the swivel 67. It will also be seen that the head may be moved manually through the screw 19 and that the slide 68 may also be moved manually through rotation of the shaft 87 or the screw 19 if clutch collar 90 is in engagement with gear 77. It is to be understood that the corresponding parts of the other head on the rail will be actuated by the screw 19' and the shaft 21', respectively.

Means unique in the machine tool field is provided for driving the heads or the slide 68 thereof individually or simultaneously at a precise feed rate of movement in timed relation with the reciprocation of the table 11, or at a traverse rate of movement. To that end, each motor 26 is a motor of the wound-rotor, induction-type and preferably a three-phase motor capable of operation strictly as an induction motor at a rate determined by the frequency of the power source and high enough for traverse rate of movement of the head or slide. Each motor is also adapted to be connected in circuit with a controlling energy source, herein a similar but larger wound-rotor, induction-type motor acting as a generator for transmitting controlling energy to the motors 26 to drive the same at a feed rate. Such a generator is indicated at 100 in Figs. 5 and 10. The generator 100 herein has a three-phase stator winding and, likewise, has a three-phase wound rotor 101. Each motor 26, likewise, has a three-phase wound stator winding and a three-phase wound rotor 102. As is well known, when the stator winding of the generator and the stator winding of the motor 26 are connected to the same source of alternating current and the rotor windings are interconnected, no current flows through the rotor circuit so long as the rotors of the generator and the motor are in corresponding positions. If, however, the rotors are displaced, that is, if they are no longer in phase correspondence, unbalanced voltages will be set up inducing current to flow through the rotor circuit. This current in turn will produce a torque synchronizing the rotors of the generator and motor. Thus the extent of rotation of a motor 26 and hence the extent of movement of the head or of the slide 68 associated with the motor may be precisely and accurately governed by governing the rotation of the generator rotor. This, of course, may be done at a remote point, requiring only electrical leads to extend between the generator and the motor, thereby eliminating the numerous splined shafts, feed screws, gearing and the like normally necessary to impart desired movements to a support.

While the rotor of the generator might be actuated manually, it is preferably actuated automatically in timed relation with the reciprocation of the table 11. Herein means, generally designated 105, are provided for effecting such rotation of the rotor 101. This means (Figs. 5-9) includes a hydraulic actuator 106 comprising a cylinder 107 having a sleeve piston 108 reciprocable therein. Opening through the head end of the cylinder is a port 109 for the reception of a conduit supplying actuating fluid to the cylinder. Herein a conduit 110 is shown connected at one end to the port 109 and connected at the other end to the valve mechanism 36, the connection with the valve mechanism being such that pressure fluid is supplied to the head end of the cylinder when the pilot valve is so actuated as to initiate the cutting stroke of the table 11. For convenience, movement of the piston 108 from right to left, as viewed in Fig. 7, under the influence of pressure fluid supplied through the port 109 will be termed the working stroke of the piston, while movement in the opposite direction will hereinafter be termed the idle or return stroke.

Means is provided for adjusting the stroke of the piston 108. To that end, there is journaled in the end of the cylinder opposite the port 109 a screw 112 having a reduced outwardly projecting portion 113 and a screw threaded inwardly projecting portion 114 of considerable length. Threadedly engaging the threaded portion 114 is a nut 115 which is held against rotation by a pin 116 carried by the nut and projecting into a longitudinally extending groove 117 formed in the wall of the cylinder 107. The nut 115 is adapted to be abutted by the open end of the piston 108 and hence to limit movement of the piston to the left, as viewed in Fig. 7. By rotating the screw 112, the nut 115 may be adjusted longitudinally of the cylinder and thereby vary the stroke of the piston 108. To impart the return stroke to the piston 108, means is provided for the alternate supply of fluid to the screw end of the cylinder 107. Accordingly, a port 118 is formed in the cylinder 107 and this port is by a conduit 118' connected to the valve mechanism 36, the connection being such that pressure fluid is supplied when the pilot valve is so actuated as to initiate the return stroke of the table 11. The screw 112 may be rotated manually or by power means. Herein it is shown as rotated by a small reversible electric motor 119, and to that end there is non-rotatably secured to the reduced outwardly projecting portion 113 of the screw a gear 120 meshing directly or through a suitable gear train with a gear 121 fast on the shaft of the electric motor 119. The device thus far described is mounted as by means of a bracket 122 within or on the bed 10 of the planer.

Means is provided to convert the reciprocatory motion of the piston 108 into rotary movement of the rotor 101 of the generator 100. To that end, the piston is formed on one external side with a rack 125 which meshes with a pinion 126 fast on a stub shaft 127 projecting upwardly, as viewed in Figs. 8 and 9, into a chamber 128 formed above the cylinder 107. The uppermost end of the shaft 127 is journaled in a plate 129 removably secured over the top of the chamber 128 to close the same. Projecting into the chamber 128 through the plate 129 is a shaft extension 130 secured as by a coupling 131 with the rotor 101 of the generator 100. The inner end of the shaft extension 130 is journaled in tapered roller bearings 132, and non-rotatable on the shaft extension is a pinion 133.

Figures 8, 9:
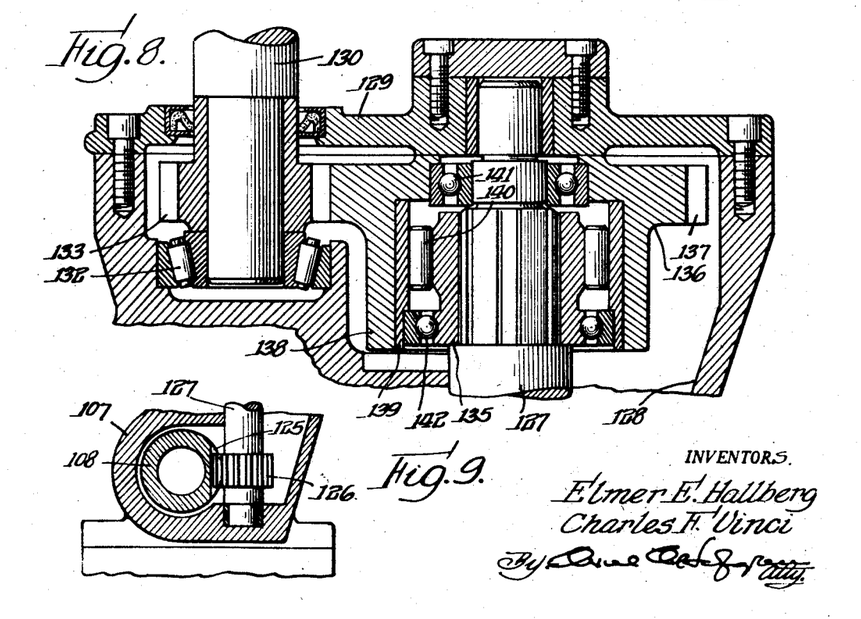
Fig. 8 is a sectional view taken approximately along the line 8—8 of Fig. 6.
Fig. 9 is a partial transverse sectional view taken approximately along the line 9—9 of Fig. 6.

Interposed between the stub shaft 127 and the pinion 133 is a one-way or overrunning clutch. The clutch disclosed is of the wedging roller type and comprises a tubular inner or driving member 135 splined internally to have a non-rotatable engagement with a splined portion of the shaft 127. Formed on the external surface of the tubular member 135 are a plurality of cam surfaces equally spaced circumferentially. An outer or driven member 136, having a gear portion 137 meshing with the pinion 133, has a tubular hub portion 138 projecting in spaced surrounding relationship to the driving member 135. Preferably, the hub portion of the driven member is lined with a sleeve 139 rigid with the driven member. Interposed between the driving member and the liner of the driven member are a plurality of rollers 140 of such diameter that they function in well known manner to permit rotation of the driving member 135 in one direction relative to the driven member, but wedge between the members and cause the driven member to rotate with the driving member upon rotation of the latter in the opposite direction. Preferably two sets of ball bearings 141 and 142 are interposed respectively between the driven member and the stub shaft 127, and between the driven member and the driving member.

Figure 10:
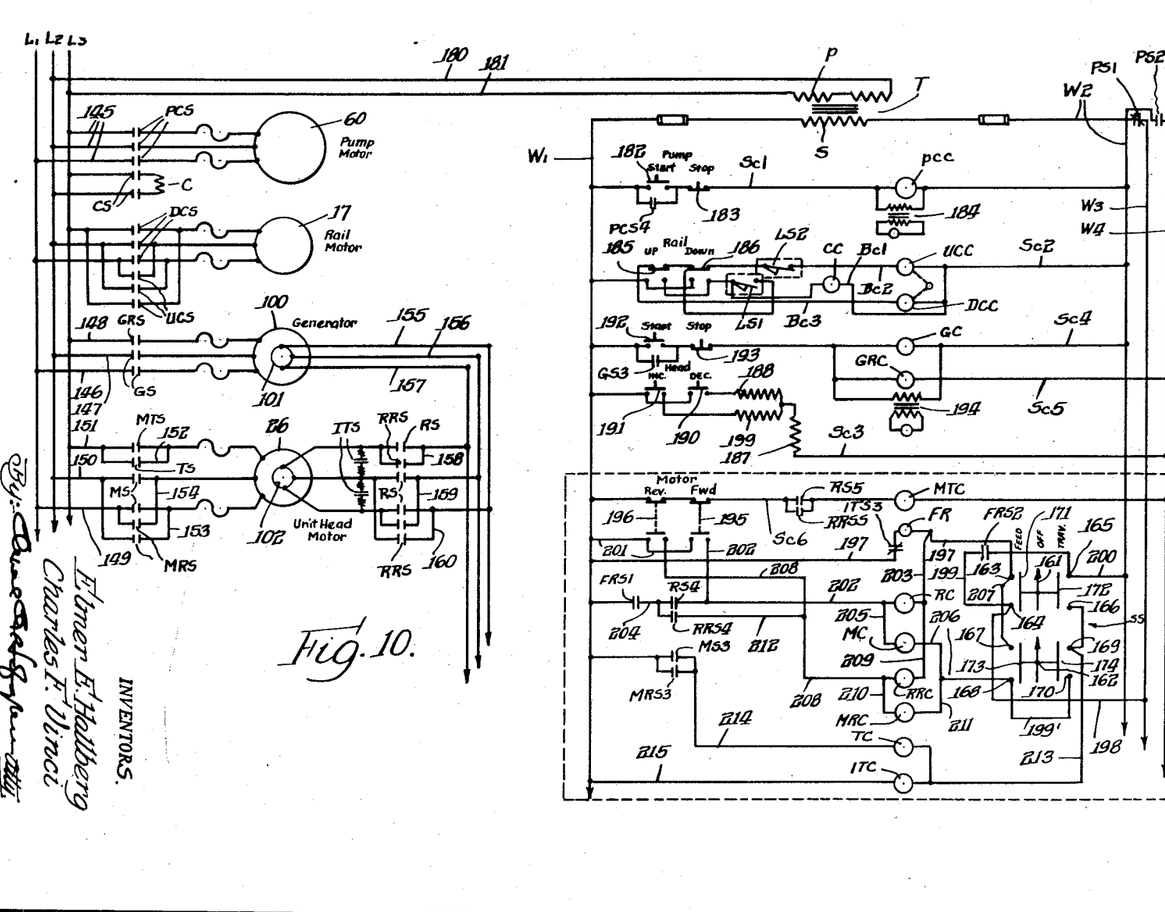
Fig. 10 is a diagrammatic view of the electrical circuit.

Reference is now made to Fig. 10 wherein there is disclosed diagrammatically the electrical system of a machine embodying this invention. The electrical system might, for convenience, be said to be composed of a power circuit and a control circuit. The power circuit is a high voltage, three-phase system supplying energy to the rail motor 17, the pumping mechanism motor 60, as well as the generator 100 and the four motors 26. In the diagram (Fig. 10), only one motor 26 is shown, but it is to be understood that the additional motors are connected in circuit in the same manner as the motor 26 shown. The pump motor 60 is under the control of a pump motor contactor having three normally open switches PCS, a fourth normally open switch PCS4 and an actuating coil PCC. The three switches PCS are located one in each of three leads 145 connecting the pump motor 60 to line wires L1, L2 and L3. The fourth switch PCS4 is a holding switch and is incorporated in the control circuit as is also the actuating coil, as will presently be described.

Connection of the rail motor 17 to the line wires is under the control of a rail-up contactor and a rail-down contactor. The rail-down contactor has three normally open switches DCS and an actuating coil DCC with the rail-up contactor, likewise, having three normally open switches UCS and an actuating coil UCC. The switches DCS and UCS are connected in well known manner in reversed leads running from the line wires to the rail motor 17 so that closure of the switches of one contactor will cause operation of the motor in one direction, while closure of the switches of the other contactor will cause operation in the reverse direction. Not shown is a rail clamping means. This means is under the control of a solenoid C adapted to be connected, as seen in Fig. 10, to the line wires L2 and L3. Energization of the solenoid is under the control of a contactor having a pair of normally open switches CS and an actuating coil CC.

The stator windings of the generator 100 are connected to the line wires L1, L2 and L3, respectively, by leads 146, 147 and 148. Interposed one in each of the leads 146 and 147 is a pair of normally open switches GS of a contactor having an actuating coil GC, and a third normally open switch GS3 serving as a holding switch. Interposed in the lead 148 is a normally open switch GRS of a contactor having an actuating coil GRC. The stator windings of the motor 26 are connected to the line wires L1, L2 and L3 respectively by direct leads 149, 150 and 151. In parallel with a portion of the lead 151 is a lead 152, and reversing the connections to the line wires L1 and L2 are leads 153 and 154. Interposed one in each of the leads 149 and 150 is a pair of normally open switches MS of a motor contactor having an actuating coil MC and a third normally open switch MS3. Interposed one in each of the reversing leads 153 and 154 is a pair of normally open switches MRS of a motor reverse contactor having an actuating coil MRC and a third normally open switch MRS3. Lead 151 has interposed therein a normally open switch MTS of a motor torque contactor having an actuating coil MTC, while interposed in the parallel lead 152 is a normally open switch TS of a traverse contactor having an actuating coil TC. Adapted to interconnect the rotor windings of the generator and the motor for rotation of the motor rotor in the same direction as the generator rotor are three leads 155, 156 and 157, while connecting the rotors for opposite rotation of the motor rotor are partial leads 158, 159 and

160. Governing the interconnection of the windings of the rotors for rotation of the rotors in the same direction is a rotor contactor having three normally open switches RS interposed one each in the leads 155, 156 and 157. The rotor contactor has an actuating coil RC and a fourth normally open switch RS4 serving as a holding switch. A rotor reverse contactor has three normally open switches RRS interposed one each in the leads 158, 159 and 160. This rotor reverse contactor has an actuating coil RRC and a fourth normally open switch RRS4. The rotor contactor and the rotor reverse contactor each has a fifth normally open switch RS5 and RRS5, respectively. The windings of the motor rotor may be short circuited through suitable resistances by the closure of a pair of normally open switches ITS of an interconnecting contactor having an actuating coil ITC. This contactor has a third switch ITS3 which is a normally closed switch and is connected in the circuit of a relay presently to be described.

In addition to the contactors already described, there is provided for each motor 26 a relay FR and a double selector switch, generally designated SS. The relay FR has two normally open switches FRS1 and FRS2, the latter of which is a holding switch. The selector switch is, as indicated, a double switch having two manually adjustable switches 161 and 162, each having a central or neutral off position, a feed position and a traverse position on opposite sides of the central or neutral position. Each switch has four stationary contacts 163, 164, 165 and 166, and 167, 168, 169 and 170, respetcively, and two movable contacts 171 and 172, and 173 and 174, respectively. Common to the entire control circuit are a normally closed pressure switch PS1 and a normally open pressure switch PS2 of a pressure device (not shown) responsive to the pressure of the fluid supplied to the generator actuating device 106.

The control circuit operates on 110 volts in order to reduce the possibility of shorts and the danger to the operator of the machine. To that end, electrical energy is supplied to the control circuit from the main line wires through a transformer T, the primary P of which is by leads 180 and 181 connected to the line wires L2 and L3, and a secondary winding S. Connected to one terminal of the secondary S is a wire W1 forming a line wire common to a plurality of parallel sub-circuits, while connected directly to the other terminal of the secondary winding S is a line wire W2. Also connected to this same terminal of the secondary winding S but through the normally closed pressure switch PS1 is a wire W3, while connected to this same terminal of the secondary winding through the normally open pressure switch PS2 is a wire W4. The first sub-circuit designated Sc1 includes in series the coil PCC of the pump motor contactor, a normally open push button switch 182, and a normally closed push button switch 183. In parallel with the normally open push button switch is the holding switch PCS4 of the pump motor contactor. The switch 182, as is readily apparent, constitutes a pump motor start switch, while the switch 183 constitutes a stop switch. Preferably a small pilot light transformer 184 is connected in parallel with the coil PCC of the contactor. A second sub-circuit Sc2 is also connected between the wires W1 and W2, and intermediate its ends is divided into three parallel branch circuits. The first of these Bc1 includes the coil CC of the rail clamp solenoid, and is adapted to be completed by either a rail-up push button switch 185 or a rail-down push button switch 186 when either is in actuated position. A normally open limit switch LS1 is controlled by the rail clamp so as to assume a closed position whenever the solenoid C is energized and the rail is no longer clamped. As will presently be seen, this limit switch LS1 is common to the circuits for both the coil UCC of the rail-up contactor and the coil DCC of the rail-down contactor, and thus assures that the rail will be unclamped before any attempt is made to move the same. The second branch circuit Bc2 includes the coil UCC of the rail-up contactor, a normally closed limit switch LS2 actuated by the rail 17 when it reaches the limit of its upward movement on the columns 12 and 13, the rail-down push button switch in its normal position, the limit switch LS1 and the rail-up switch 185 in its actuated position. Similarly the third branch circuit Bc3 includes the coil DCC of the rail-up contactor, the rail-up push button switch 185 in its normal position, limit switch LS1 and the rail-down push button switch 186 in its actuated position. It will thus be seen that the rail cannot be moved up if the limit switch LS2 is open, but that it may be moved downwardly, and that it is not possible that both the switch 185 and the switch 186 will be simultaneously actuated and have them effective to energize the coils of the rail contactors. A third sub-circuit Sc3 is connected between the wires W1 and W4 and includes in series one winding 187 of the motor 119. In series with the winding 187 and in parallel with one another are windings 188 and 189 of the motor 119, respectively operable upon energization to cause rotation of the motor in such direction as to decrease and increase, respectively, the stroke of the piston 108. Energization of the winding 188 is under the control of a normally open push button switch 190 connected in series therewith, while energization of the winding 189 is under the control of a normally open push button switch 191. It will be apparent from the foregoing that the motor 119 will operate only when the pressure actuated switch PS2 is closed, that is, during the time that fluid under pressure is being supplied to the cylinder 107.

A fourth sub-circuit Sc4 is connected between the wires W1 and W2 and includes in series the coil GC of the generator contactor, a generator start, normally open push button switch 192, and a normally closed, generator stop push button switch 193. In parallel with the switch 192 is the holding switch GS3 of the generator contactor. The switches 192 and 193 are also common to a fifth sub-circuit Sc5 which includes the coil GRC of the generator run contactor and which is connected to the wire W4, as distinguished from the wire W2. A pilot light transformer 194 may be connected in parallel with the coil GC of the generator contactor.

A sixth sub-circuit Sc6 is connected between the wires W1 and W4 and includes the coil MTC of the motor torque contactor, the switches RS5 and RRS5 in parallel, and the top blade of a double blade push button switch 195 and the top blade of a second double blade push button switch 196. Both of the switches 195 and 196 are biased to a normal position in which the switches including the upper blades are closed, whereas the switches including the lower blades are open. 195 constitutes a motor forward switch, while 196 constitutes a motor reverse switch. The relay FR and the coils RC, MC, RRC and MRC are all electrically associated with the feed side of the selector switch SS. An energizing circuit for the relay FR is formed when the switch 161 is shifted to its feed position. Such an energizing circuit includes a lead 197 connected at one end to the wire W1 and at the other end to the stationary contact 163, movable contact 171, stationary contact 164 and a lead 198 connected to the wire W3, the relay FR being incorporated in the lead 197. A holding circuit for the relay is completed by a lead 199 extending from the stationary contact 164 to the stationary contact 165 and including the switch FRS2 and a lead 200 from the stationary contact 165 to wire W2. It is believed apparent from the above that the relay FR may be energized only when the pressure switch PS1 is closed. The significance of this is that no motor 26 may be conditioned for operation except during the return movement of the table 11.

An energizing circuit for the coil RC of the contactor includes a lead 201, lower blade of switch 195, lead 202, coil RC and lead 203 connected to the lead 197 intermediate the relay FR and the contact 163. A holding circuit for the coil RC is formed by a lead 204 connected at one end to the wire W1 and at the other end to the lead 202 and including the switches FRS1 and RS4. This holding circuit is, of course, further completed by the same portion of the circuit completing the holding circuit for the relay FR. An energizing circuit for the coil MC of the motor contactor is completed simultaneously with the energizing circuit for the coil RC and includes a lead 205 branching from the lead 202, coil MC, a lead 206 running from the coil MC to the stationary contact 168, movable contact 173, a lead 207 interconnecting stationary contacts 164 and 167, movable contact 171 and lead 198. A holding circuit for the coil MC is formed by the lead 204 with its switches FRS1 and RS4 and by the lead 198 with its switch FRS2, as previously described for the relay FR. An energizing circuit for the coil RRC of the rotor reverse contactor includes a part of lead 201, lower blade of switch 196, a lead 208, coil RRC and a lead 209 connected to the lead 203 and thence as previously described for the coil RC. An energizing circuit for the coil MRC of the motor reverse contactor includes lead 201, switch 196 and lead 208, as previously described for coil RRC, a lead 210, coil MRC and a lead 211 connected to the lead 206, and thence through the selector switch SS as described for the coil MC. A holding circuit for the coils RRC and MRC includes that portion of lead 204 containing switch FRS1, a lead 212 containing switch RRS4 and connected to the lead 208. The balance of the holding circuits are formed as previously described for the coils RC and MC, respectively.

The coils MC and MRC are also associated with the traverse side of the selector switch SS through a jumper lead 199' extending between stationary contacts 168 and 170. Exclusively associated with the traverse side of the selector switch are the coils TC and ITC. A common lead 213 extends from the coils TC and ITC to the stationary contacts 169 and 166, with the contacts connectible to the wire W2 through the movable contact 172 and lead 200. The circuit for the coil TC is completed by a lead 214 which is connected to the wire W1 and includes in parallel the switches MS3 and MRS3. The circuit for the coil ITC is completed by a lead 215.

Figure 7:
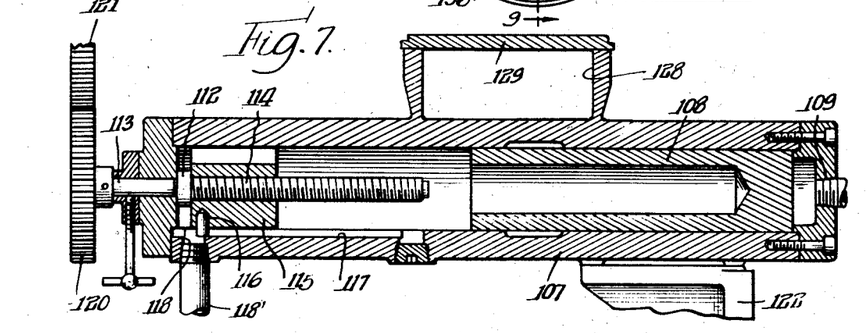
Fig. 7 is a longitudinal sectional view of the feed cylinder taken approximately along the line 7—7 of Fig. 6.

For a better and more complete understanding of the invention, particularly the operation of the electrical system, the operation of the machine tool will be described briefly. Let it be assumed that the machine is at rest. In that event table 11 would be at the end of its return stroke and the piston 108 of the generator actuating means would be at its extreme right hand position, as shown in Fig. 7. The operator of the machine now first momentarily closes push button switch 182, thereby energizing coil PCC and causing the pump contactor to connect the pump motor 60 to the line wires. With such energization of the coil PCC, switch PCS4 closes to complete a holding circuit for the coil to maintain the contactor in actuated position, even though the operator now permits switch 182 to return to its normal open position. Next the operator would, by closure of the switch 185 or 186, run the rail 14 up or down as required, and would, by closure of the switches 190 or 191, adjust the screw 112 to provide for the desired feed stroke of the piston 108.

Next the operator would momentarily close the generator start switch 192. Closure of the switch 192 would complete the circuit to the generator contactor coil GC thereby closing the switches GS to connect one phase of the generator stator windings to the power source. At the same time, the switch GS3 would be closed to complete a holding circuit for the coil GC. Assuming further that some one or more of the heads 25 or the slides 68 thereof are to be fed intermittently as the table 11 is reciprocated, the operator would next throw the clutch collar 90 to the desired position and would then shift the switches 161 and 162 of the selector switch to feed position. It is to be understood that the operator would shift the particular selector switches associated with the heads desired to be actuated. Shift of the switch 161 to feed position would, in the first place, cause energization of the relay FR, the energizing circuit being from wire W1, through lead 197 which includes the relay FR, movable contact 171, lead 198 to wire W3 which is now through the closed pressure switch PS1 connected to the other side of the transformer secondary S. Energization of the relay would close the switch FRS2 to complete a holding circuit for the relay independent of the switch PS1, and closure of the switch FRS1 would partially condition a holding circuit for the coils RC, MC, RRC and MRC. This shift of the switch 161 to feed position would also partially condition energizing circuits for the coils RC and RRC, while shift of the switch 162 to feed position partially conditions energizing circuits for the coils MC and MRC. Depending upon whether the particular head is to be moved forwardly or reversely, the operator next actuates the appropriate one of the switches 195 or 196. If it be assumed that forward movement of the head is desired, the operator momentarily actuates the switch 195. Such actuation of the switch 195 closes the switch formed by the lower blade of the switch 195 to complete an energizing circuit for the coils RC and MC through the circuits previously traced. Energization of the coil RC actuates the rotor contactor to close the switches RS connecting the rotor windings of the motor to the rotor windings of the generator and also closing switch RS4 to complete a holding circuit for the coils RC and MC, since the switch FRS1 is already closed. Also closed is switch RS5 so that upon return of the switch 195 to its normal position the sub-circuit Sc6 is conditioned for energization of the coil MTC as soon as the normally open pressure switch PS2 is closed. Energization of the coil MC actuates the motor contactor to close the two switches MS connecting one phase of the motor stator windings to the power source. The switch MS3 of the motor contactor will also be closed but the coil TC is not energized because the circuit is broken at the selector switch. Though one phase of the stator winding of each the generator and the motor are now connected to the power source and the rotor windings are interconnected, no movement of the motor rotor takes place, for presumably the motor was in synchronism with the generator when the machine was arrested.

The machine has now been conditioned for operation and the operator next adjusts the start and stop valve 61 of the valve mechanism 36 to cause fluid under pressure to be supplied to the motor 30 for driving the table 11 in its forward or cutting stroke. As a result, fluid under pressure is supplied to the cylinder 107 shifting the piston 108 through its working stroke and, through the overrunning clutch and other mechanism described, rotating the rotor of the generator. Such supply of fluid under pressure to the cylinder 107 will also act on the pressure responsive device, opening the switch PS1 and closing the switch PS2. Opening of switch PS1 has no effect on the various contactor coils or the relay FR already energized, for holding circuits independent of the switch PS1 have been set up. However, opening of the switch PS1 does prevent conditioning for operation of other of the motors 26 not previously conditioned by shift of the appropriate selector switch. Closure of the switch PS2, however, causes energization of the coil GRC of the generator run contactor and the coil MTC of the motor torque contactor. The energizing circuit for the coil GRC had previously been conditioned by closure of the holding switch GS3, while the energizing circuit for the coil MTC had been conditioned by closure of the switch RS5. Energization of the coil GRC will cause switch GRS to be closed, thereby connecting the remaining two phases of the generator stator windings to the line wires, while energization of the coil MTC will close the switch MTS, likewise connecting the remaining two phases of the motor stator winding to the line wires. With the full power now applied to the generator and motor stator windings, and with the rotor windings already connected, the rotation which is imparted to the rotor of the generator by the piston 108 will set up in the motor a torque causing the rotor of the motor to follow precisely the rotation of the generator rotor. As a consequence, the head or the slide on the head, depending upon which drive train the operator had previously clutched to the motor, will be advanced a predetermined amount as determined by the adjustment of the feed screw 112. It will be appreciated that this usually slight advance is effected during the initial movement of the table 11 in its cutting or forward stroke, and thus is completed before the tool engages the work.

Should the operator find that the cut taken by the tool is either too deep or not deep enough, the setting of the feed screw 112 may be changed during the cutting or forward stroke of the table 11 simply by depressing either the push button switch 190 or the push button switch 191. Except for the above mentioned change in the adjustment of the feed screw 112, which is not customary once the machine has been adjusted for operation, no changes take place after the movement of the head or slide has been effected until the table 11 has reached the end of its forward or cutting stroke and is reversed and started on its return stroke. During the return stroke, pressure fluid in the head end of cylinder 107 is relieved and fluid supplied to the screw end through port 118 to return the piston 108 to its normal position, which movement of the piston is, due to the overrunning clutch means, effected without rotation of the generator rotor. Such relief of pressure in the cylinder 107 also results in the reopening of pressure switch PS2 and the reclosing of pressure switch PS1. Opening of the switch PS2 deenergizes the coils GRC and MTC, resulting in the opening of the switches GRS and MTS, respectively, to leave only one phase of the stator windings of each the generator and the motor connected to the line wires. Closing of the switch PS1 again conditions the control circuit so that by shift of a selector switch SS other of the motors 26 may be conditioned for operation. As the table 11 completes its return stroke and through dog 59 shifts the pilot valve to initiate a forward or cutting stroke of the table, the cycle is, of course, repeated and this continues until the machining operation is complete and the operator arrests reciprocation of the table 11.

If now the operator wishes to return the head or the slide to its initial position, he may effect such return at a traverse rate by shifting the switches 161 and 162 of the selector switch SS to traverse position. Such shift will, first of all, break the circuits to the relay FR the coils RC, RRC and MTC. This in turn will open the switches RS or RRS to disconnect the rotor windings of the motor from those of the generator, and will also open the switches MS and MRS momentarily to complete disconnection of the motor stator windings from the line wires. When the movable contacts 172 and 174 engage their respective stationary contacts, however, the system will be conditioned for running the motor 26 as a conventional three-phase motor for driving the head or a slide at a traverse rate under the control of the operator. Thus the coil ITC will be energized to close the switches ITS to interconnect the motor rotor windings through suitable resistances, the circuit for the coil ITC being wire W1, lead 215, coil ITC, lead 213, movable contact 172, and lead 200 to wire W2. Energizing circuits will also be conditioned for the coil TC and for the coils MC and MRC, completion of these last mentioned circuits being under the control of the operator through the forward or reverse switches 195 and 196. Thus the circuit for the coils MC or MRC, starting for convenience with the line wire W2, would be lead 200, movable contacts 172 and 174, the jumper lead between stationary contacts 170 and 168 and thence by branch circuits through lead 206, coil MC, leads 205 and 202, lower blade of switch 195, and lead 201; or lead 211, coil MRC, lead 208, and lower blade of switch 196, and lead 201. It is to be noted that no holding circuits are established, the coils MC or MRC being energized only so long as the operator maintains the switch 195 or switch 196 in actuated position.

If it be assumed that the operator desires to return the head or slide, he would depress the switch 196, thereby completing the circuit to the coil MRC. This would actuate the motor reverse contactor closing switches MRS, thereby connecting one phase of the stator windings to the line wires. Also closed would be switch MRS3 which would complete the energizing circuit for the coil TC. Energization of the coil TC would result in closure of the switch TS, thereby connecting the remaining two phases of the motor stator winding to the line wires and causing operation of the motor at a rate driving the head or the slide at rapid traverse. Operation of the motor would be stopped by release of the switch 196. To completely arrest operation of the machine, the operator would, of course, return all of the selector switches to their off position and would open the switch 193 to break the circuit for the coil GC of the generator contactor and open the switch 183 to stop the pump motor 60.

While believed apparent from the foregoing, it is again pointed out that both the power and the control circuit for but a single motor 26 have been shown and that these are duplicated for each of the motors 26. That portion of the control circuit to and inclusive of the sub-circuit Sc5 is, of course, common, while the remainder of the circuit as shown in Fig. 10, namely, that in the broken line outline, will be duplicated for each of the motors 26. It is also to be understood that the circuit will include fuses, overload relays and other safety devices, all as conventional in the art. Where "contactor" has been employed herein, any suitable switch means or device capable of operating as described is intended.

We claim as our invention:

1. In a machine tool having a frame and a stationary engageable means thereon, a support mounted on the frame for movement relative thereto, means carried by said support adapted cooperatively to engage the engageable means on the frame and operating when driven to impart movement to said support, and means for driving said last named means comprising a wound-rotor, induction-type motor of a self-synchronous system mounted on said movable support, a generator of the self-synchronous system mounted remote from said support, a control circuit governing connection of said motor and of said generator to a source of electrical energy and to one another to obtain movement of said support at feed or traverse rates, and means for rotating the rotor of said generator.

2. In a machine tool having a frame and a stationary engageable means thereon, a support mounted on the frame for movement relative thereto, means carried by said support adapted cooperatively to engage the engageable means on the frame and operating when driven to impart movement to said support, and means for driving said last named means comprising a wound-rotor, three-phase, induction-type motor mounted on said movable support, means for connecting said motor to a source of electrical energy and for interconnecting the rotor windings to cause operation of said motor as an induction motor at a speed commensurate with the frequency of the electrical energy source to drive said support at a traverse rate, a second source of electrical energy, means for connecting said rotor windings thereto, and means for varying the phase of said second source relative to the induced voltage in said windings to cause said motor to drive said support at a feed rate.

3. In a machine tool having a frame and a stationary engageable means thereon, a support mounted on the frame for movement relative thereto, means carried by said support adapted cooperatively to engage the engageable means on the frame and operating when driven to impart movement to said support, and means for driving said last named means comprising a self-synchronous motor and generator system, with the motor of the system mounted on said movable support and the generator mounted remote from said movable support, means for connecting the stator windings of said motor and of said generator to the same source of electrical energy and for electrically connecting the rotor windings of said motor and of said generator to effect movement of said support at a rate and to an extent determined by rotation of said generator rotor, and means for maintaining said motor stator windings connected to the source of electrical energy while breaking the electrical connections between said motor and generator rotor windings and interconnecting the motor rotor windings to cause operation of said motor as an induction motor independently of said generator at a rate determined by the frequency of the source of electrical energy.

4. In a machine tool having a frame and a stationary engageable means thereon, a support mounted on the frame for movement relative thereto, means carried by said support adapted cooperatively to engage the engageable means on the frame and operating when driven to impart movement to said support, and means for driving said last named means comprising a three-phase, wound-rotor, induction-type motor mounted on said movable support, a generator having a three-phase, wound rotor, means for connecting the stator windings of said motor and of said generator to the same source of electrical energy and for connecting the rotor windings of said motor and of said generator to effect movement of said support at a rate and to an extent determined by rotation of said generator rotor, and means maintaining said motor stator windings connected to the source of electrical energy while disconnecting the motor rotor windings from the generator rotor windings and interconnecting the same to cause operation of said motor as an induction motor at a rate determined by the frequency of the source of electrical energy.

5. In a machine tool having a frame and a stationary engageable means thereon; a support mounted on the frame for movement relative thereto; means carried by said support adapted cooperatively to engage the engageable means on the frame and operating when driven to impart movement to said support; and means for driving said last named means comprising a three-phase, wound-rotor, induction-type motor mounted on said movable support; a similarly constructed electrical device adapted to function as a generator mounted remote from said movable support; means governing the electrical connections of said motor and said generator to effect movement of said support at a traverse rate or a feed rate including contactors for connecting the stator windings of said generator to a source of electrical energy to provide excitation energy; a first plurality of contactors operable when actuated to connect the stator windings of said motor to the same source of electrical energy and to connect the rotor windings to the rotor windings of said generator whereby rotation of said motor rotor conforms to rotation of said generator rotor adapting said motor for driving said movable support at a feed rate; a second plurality of contactors operable when actuated to connect the stator windings of said rotor to the source of electrical energy, to break the connection between the rotors of said motor and said generator and to interconnect the windings of said motor rotor to adapt the same for operation as an induction motor for driving said support at a traverse rate of movement; an actuating coil for each of said contactors; and a control circuit including said coils and having sub-circuits including the coils of said first and second plurality of contactors, a feed-traverse selector switch conditioning circuits determining feed or traverse operation, and a manually operable switch exercising final control over the circuits conditioned by said selector switch.

6. In a machine tool having a frame and a stationary engageable means thereon; a support mounted on the frame for movement relative thereto; means carried by said support adapted cooperatively to engage the engageable means on the frame and operating when driven to impart movement to said support; and means for driving said last named means comprising a three-phase, wound-rotor, induction-type motor mounted on said movable support; a similarly constructed electrical device adapted to function as a generator mounted remote from said movable support; means governing the electrical connections of said motor and said generator to effect movement of said support at a traverse rate or a feed rate including electric switch devices for connecting the stator windings of said generator to a source of electrical energy to provide excitation energy, second electric switch devices operable when actuated to connect the rotor windings of said generator and said motor; third electric switch devices operable when actuated to connect said motor stator windings to the source of electric energy; said motor rotor operating when said three electric switch devices are actuated to rotate in synchronism with the rotation of said generator rotor; fourth electric switch devices operable when actuated to interconnect the windings of said motor rotor and fifth electric switch devices operating conjointly with certain of said third switch devices to connect the stator windings of said motor to the source of electric energy for obtaining operation of said motor as an induction motor independently of said generator for imparting traverse movements to said movable support; an actuating coil for each of said electric switch devices and a control circuit including said coils and having sub-circuits including the coils of said second switch devices, of said third switch devices, of said fifth switch devices, and the coil for certain of said fourth switch devices; a selector switch having a feed position and a traverse position and operable to condition circuits determining feed or traverse operation; a manually operable switch exercising final control over the circuits conditioned by said selector switch; a holding circuit for the coil of said second switch devices and for the coil of said certain of said fourth switch devices, said second switch devices including a normally open switch connected in said holding circuit; and a relay connected in circuit only when said selector switch is in feed position having a normally open switch, closed upon energization of the relay, also connected in said holding circuit to require temporary actuation only of said manually operable switch when said selector switch is in feed position while requiring holding of the manually operable switch in actuated position to obtain traverse rate of operation of said motor when said selector switch is in traverse position.

7. In a machine tool having a frame and a main member reciprocable through a cutting and a return stroke; a plurality of supports mounted on the frame for movement relative thereto; each of said supports carrying means operable to engage an element on the machine tool to impart movement to the support and a three-phase, wound-rotor, induction-type motor for driving said means; switch means for each of said motors independently operable to connect each motor to a source of electrical energy and otherwise condition each motor for operation as an induction motor to effect traverse movement of the support on which each motor is mounted; an electrical device similar to said motors operable to function as a generator common to all of said motors; switch means operable to connect said generator to the same source of electrical energy to which said motors are connected; switch means for each motor operable to connect the windings of each motor rotor to the windings of the generator rotor for completing a self-synchronous system in which each motor rotor so connected follows the movements of the generator rotor, and a control system for said generator and motors including means individual to each of said motors governing said switch means to effect operation of each motor independently of or dependently upon said generator and means preventing connection of a motor for dependent operation during a cutting stroke of the main member.

8. In a machine tool having a frame and a main member reciprocable through a cutting and a return stroke; a plurality of supports mounted on the frame for movement relative thereto; each of said supports carrying means operable to engage an element on the machine tool to impart movement to the support and a three-phase, wound-rotor, induction-type motor for driving said means; switch means for each of said motors independently operable to connect each motor to a source of electrical energy and otherwise condition each motor for operation as an induction motor to effect traverse movement of the support on which each motor is mounted; an electrical device similar to said motors operable to function as a generator common to all of said motors; switch means operable to connect said generator to the same source of electrical energy to which said motors are connected; switch means for each motor operable to connect the windings of each motor rotor to the windings of the generator rotor for completing a self-synchronous system in which each motor rotor follows the movements of the generator rotor; and a control system for said generator and motors including a switch device having a first switch closed during the return stroke and open during the cutting stroke of said main member and a second switch open during the return stroke and closed during the cutting stroke of said main member; and means individual to each of said motors governing said switch means to effect operation of each motor independently of or dependently upon said generator, said last named means exercising control over the switch means for connecting the motor independently of said generator independently of either of the switches of said switch device to permit operation of any support at a traverse rate at any time, and acting through the switches of said switch device in the control of said switch means connecting each motor for dependent operation to permit connection of each motor for dependent operation only during the return stroke of said main member.

9. In a machine tool having a frame and a main member reciprocable through a cutting and a return stroke; a plurality of supports mounted on the frame for movement relative thereto; each of said supports carrying means operable to engage an element on the machine tool to impart movement to the support and a three-phase, wound-rotor, induction-type motor for driving said means; switch means for each of said motors independently operable to connect each motor to a source of electrical energy and otherwise condition each motor for operation as an induction motor to effect traverse movement of the support on which each motor is mounted; an electrical device similar to said motors operable to function as a generator common to all of said motors; switch means operable to connect said generator to the same source of electrical energy to which said motors are connected; switch means for each motor operable to connect the windings of each motor rotor to the windings of the generator rotor for completing a self-synchronous system in which each motor rotor follows the movements of the generator rotor; an actuating coil for each of said switch means; and a control circuit including said coils, a selector switch having a feed and a traverse position, and a switch device responsive to the movements of the main member and having a first switch closed during the return stroke of the main member and open during the cutting stroke, and a second switch open during the return stroke and closed during the cutting stroke of the main member; said selector switch in traverse position connecting certain coils in circuits independent of said switch device to permit operation of a support at traverse rate independently of the stroke of the main member and in feed position connecting the coils in circuits having said first switch in series therewith to permit conditioning of the switch means for dependent operation of each motor only when said first switch is closed.

10. In a machine tool having a frame and a main member reciprocable through a cutting and a return stroke; a plurality of supports mounted on the frame for movement relative thereto; each of said supports carrying means operable to engage an element on the machine tool to impart movement to the support and a three-phase, wound-rotor, induction-type motor for driving said means; switch means for each of said motors independently operable to connect each motor to a source of electrical energy and otherwise condition each motor for operation as an induction motor to effect traverse movement of the support on which each motor is mounted; an electrical device similar to said motors operable to function as a generator common to all of said motors; switch means operable to connect said generator to the same source of electrical energy to which said motors are connected; switch means for each motor operable to connect the windings of each motor rotor to the windings of the generator rotor for completing a self-synchronous system in which each motor rotor follows the movements of the generator rotor; an actuating coil for each of said switch means; and a control circuit including said coils, a selector switch having a feed and a traverse position, and a switch device responsive to the movements of the main member and having a first switch closed during the return stroke of the main member and open during the cutting stroke and a second switch open during the return stroke and closed during the cutting stroke of the main member; said selector switch in traverse position connecting certain coils in circuits independent of said switch device to permit operation of a support at traverse rate independently of the stroke of the main member and in feed position connecting certain coils in circuits having said first switch in series therewith to permit conditioning of the switch means for dependent operation of each motor only when said first switch is closed, and a relay operable upon shift of the selector switch to feed position when said first switch is closed to condition the control circuit for operation independently of either of the switches of said switch device.

11. In a machine tool having a frame, a stationary engageable means thereon and a main member reciprocable through a cutting and a return stroke; a support mounted on the frame for movement relative thereto; means carried by said support adapted cooperatively to engage the engageable means on the frame and operating when driven to impart movement to said support; and means for driving said last named means to obtain a feed or a traverse rate of movement of the support comprising a three-phase, wound-rotor, induction-type motor mounted on said movable support; a motor contactor and a motor torque contactor operable when actuated to connect the stator windings of said motor to a source of electrical energy; an interconnecting contactor operable when actuated to interconnect the rotor windings of said motor conditioning the motor for operation as an induction motor to effect traverse movement of the support; an electrical device similar to said motor operable to function as a generator; a generator contactor and a generator-run contactor operable when actuated to connect said generator stator windings to the same source of electrical energy to which the motor is connected; a rotor contactor operable when actuated to connect the windings of said motor rotor to the windings of said generator rotor for completing a self-synchronous system in which the motor rotor follows the movements of the generator rotor; an actuating coil for each of said contactors; means operating in timed relation with the reciprocation of the main member to rotate said generator rotor; a switch device having a first and a second switch with said first switch closed and said second switch open during the return stroke of the main member, and said first switch open and said second switch closed during the cutting stroke of the main member; and a control circuit for said controllers having a first sub-circuit including the coil of the generator contactor and a normally open and a normally closed push button switch connected in series directly across the control circuit; a plurality of sub-circuits each including one of the coils for the rotor contactor, the motor contactor, the traverse contactor and the interconnecting contactor; a selector switch having a traverse and a feed position, said selector switch in its traverse position connecting the sub-circuits containing said motor contactor coil, said traverse contactor coil and said interconnecting contactor coil in the control circuit independently of said first and second switches to permit operation of the motor for effecting traverse movement of the support at any time, said selector switch in feed position connecting the sub-circuits containing the rotor contactor coil and the motor contactor coil in the control circuit through said first switch to permit conditioning of the motor for operation at a feed rate only during the return stroke of the main member; a sub-circuit including a relay and also including said selector switch when in feed position and said first switch, said relay having a pair of switches closed upon energization thereof, one of which upon closure establishes a circuit for the rotor contactor coil and the motor contactor coil independently of said first switch, and the other of which upon closure conditions a holding circuit for said rotor contactor and motor contactor coils; a manually actuable switch in the circuits containing said rotor contactor and motor contactor coils; and a pair of sub-circuits including respectively said generator-run contactor coil and said motor torque contactor coil connected in the control circuit through said second switch to complete the connection of the stator windings of said generator and motor to the source of electrical energy when the cutting stroke of the main member is initiated.

12. In a machine tool having a frame, a main member reciprocable through a cutting and a return stroke, and hydraulic means for driving the main member; a plurality of supports mounted on the frame for movement relative thereto; each of said supports carrying means operable to engage an element on the machine tool to impart movement to the support and a three-phase, wound-rotor, induction-type motor for driving said means; switch means for each of said motors independently operable to connect each motor to a source of electrical energy and otherwise condition each motor for operation as an induction motor to effect traverse movement of the support on which each motor is mounted; an electrical device similar to said motors operable to function as a generator common to all of said motors; switch means operable to connect said generator to the same source of electrical energy to which said motors are connected; switch means for each motor operable to connect the windings of each motor rotor to the windings of the generator rotor for completing a self-synchronous system in which each motor rotor so connected follows the movements of the generator rotor; means for intermittently rotating the rotor of said generator in timed relation with the reciprocation of the main member including variable stroke hydraulic means associated with the hydraulic means driving the main member to be actuated upon conditioning of the hydraulic means for driving the main member through a cutting stroke; means for adjusting the stroke of the rotor rotating means including a reversible electric motor; and a control system for said generator and said motors of the self-synchronous system and for said reversible motor including means individual to each of said first named motors governing said switch means to retain the motor inoperative or to effect operation thereof independently of or dependently upon said generator and means preventing connection of a motor for dependent operation during a cutting stroke of the main member while permitting connection of a motor for operation independent of said generator during either stroke of the main member and preventing adjustment of said generator rotor rotating means during the return stroke of the main member.

13. In a machine tool having a frame, a stationary engageable means thereon and a main member reciprocable through a cutting and a return stroke; a support mounted on the frame for movement relative thereto; means carried by said support adapted cooperatively to engage the engageable means on the frame and operating when driven to impart movement to said support; and means for driving said last named means comprising a self-synchronous motor and generator system, with the motor of the system mounted on said movable support and the generator mounted remote from said movable support; means for connecting the stator windings of said motor and of said generator to the same source of electrical energy and for electrically connecting the rotor windings of said motor and of said generator to effect movement of said support at a rate and to an extent determined by rotation of said generator rotor; means for maintaining said motor stator windings connected to the source of electrical energy while breaking the electrical connections between said motor and generator rotor windings and interconnecting the motor rotor windings to cause operation of said motor as an induction motor independently of said generator at a rate determined by the frequency of the source of electrical energy; adjustable means operable in timed relation with the reciprocation of the main member to rotate the rotor of said generator; a reversible electric motor for actuating said adjustable means to vary the extent of rotation imparted thereby to said generator rotor; and a control circuit for the means connecting said motor and generator and for said reversible motor including means for controlling the direction of rotation of said reversible motor to increase or decrease the rotation imparted to said generator rotor, and means preventing operation of said reversible motor during the return stroke of the main member.

14. A unitary head for a machine tool or the like comprising a saddle adapted for engagement with ways on the machine tool for movement therealong, an electric motor carried by said saddle, a shaft driven by said motor rotatably mounted in said saddle, means including an element rotatable on said shaft and formed with clutch teeth engageable with means fixed in the machine tool for moving said saddle along the ways, a slide supported on and reciprocable relative to said saddle, a drive screw rotatably journaled in said slide while held against axial movement relative thereto, manually operable means engaging said drive screw for holding said drive screw against rotation when said slide is to be power driven and for rotating said drive screw when said slide is to be manually driven, means for power driving said slide comprising a nut surrounding said screw and having threaded engagement therewith, said nut being held against axial movement relative to said saddle, a gear element rotatable on said motor driven shaft and having clutch teeth formed thereon and gearing interconnecting said nut and said gear element, and a clutch collar splined to said motor driven shaft and operable to be shifted selectively into clutching engagement with one or the other of said elements.

15. In a machine tool having ways, a rigidly mounted screw extending parallel with the ways, a worm wheel threadedly engaging the screw, a unitary head comprising a saddle adapted to be mounted on the ways for reciprocation therealong, an electric motor carried by said saddle, a shaft forming an extension of said motor shaft rotatably journaled in said saddle, a worm having clutch teeth formed on one end thereof rotatable on said shaft and adapted when said saddle is mounted on the ways to engage the worm wheel, means on said saddle for holding the worm wheel against axial movement relative to said saddle when the latter is in position on the ways, a slide supported on and reciprocable relative to said saddle, means for actuating said slide relative to said saddle including a gear having clutch teeth formed on one face thereof rotatable on said shaft, and a clutch collar splined to said shaft and shiftable into clutching engagement with said gear or said worm for causing said slide to be moved relative to said saddle or for causing the entire head to be moved along the ways.

ELMER E. HALLBERG.
CHARLES F. VINCI.